(12) United States Patent
Belyakov et al.

(10) Patent No.: US 6,195,252 B1
(45) Date of Patent: Feb. 27, 2001

(54) CAPACITOR WITH DUAL ELECTRIC LAYER

(75) Inventors: Alexei Ivanovich Belyakov, Kursk; Oleg Grigorievich Dashko, Korolev; Vladimir Alexandrovich Kazarov; Samvel Avakovich Kazaryan, both of Troitsk; Sergei Vitalicvich Litvinenko; Vladimir Ivanovich Kutyanin, both of Moscow; Pavel Andreevich Schmatko; Vladimir Ivanovich Vasechkin, both of Korolev; Jury Mironovich Volfkovich, Moscow, all of (RU)

(73) Assignees: Nauchno-Proizvodstvennoe Predpriyatie Eskin; Zakrytoe Aktsionernoe Obschestvo Esma, both of Moscow (RU)

( * ) Notice: Subject to any disclaimer, the term of this patent is extended or adjusted under 35 U.S.C. 154(b) by 0 days.

(21) Appl. No.: 09/341,409
(22) PCT Filed: Nov. 11, 1997
(86) PCT No.: PCT/RU97/00353
§ 371 Date: Aug. 25, 1999
§ 102(e) Date: Aug. 25, 1999
(87) PCT Pub. No.: WO99/24996
PCT Pub. Date: May 20, 1999

(51) Int. Cl.[7] ........................................... H01G 9/00
(52) U.S. Cl. .............................. 361/502; 361/508
(58) Field of Search ..................... 361/502, 504, 361/508–509, 512, 528–529

(56) References Cited

U.S. PATENT DOCUMENTS

| | | | |
|---|---|---|---|
| 4,313,084 | 1/1982 | Hosokawa et al. | 323/370 |
| 4,674,010 | 6/1987 | van den Steen | 361/500 |
| 4,697,224 | 9/1987 | Watanabe et al. | 361/502 |
| 4,713,734 | 12/1987 | DeKay | 362/147 |
| 4,896,249 | 1/1990 | Endo et al. | 361/502 |
| 5,381,303 | * 1/1995 | Yoshida et al. | 361/502 |
| 5,682,288 | * 10/1997 | Wani | 361/502 |

FOREIGN PATENT DOCUMENTS

| | | |
|---|---|---|
| 1 921 610 | 8/1979 | (DE) . |
| 3 210 420 | 9/1983 | (DE) . |
| 2 052 384 | 4/1971 | (FR) . |
| 2 054 723 | 2/1996 | (RU) . |
| 2 063 085 | 6/1996 | (RU) . |
| WO92/12521 | 7/1992 | (WO) . |
| WO97/07518 | 2/1997 | (WO) . |

* cited by examiner

*Primary Examiner*—Anthony Dinkins
(74) *Attorney, Agent, or Firm*—Collard & Roe, P.C.

(57) ABSTRACT

A dual electric layer capacitor having one of its electrodes made of a carbon material and the other electrode from a material containing lead dioxide.

The capacitor under consideration features improved specific characteristics and lower cost.

4 Claims, 1 Drawing Sheet

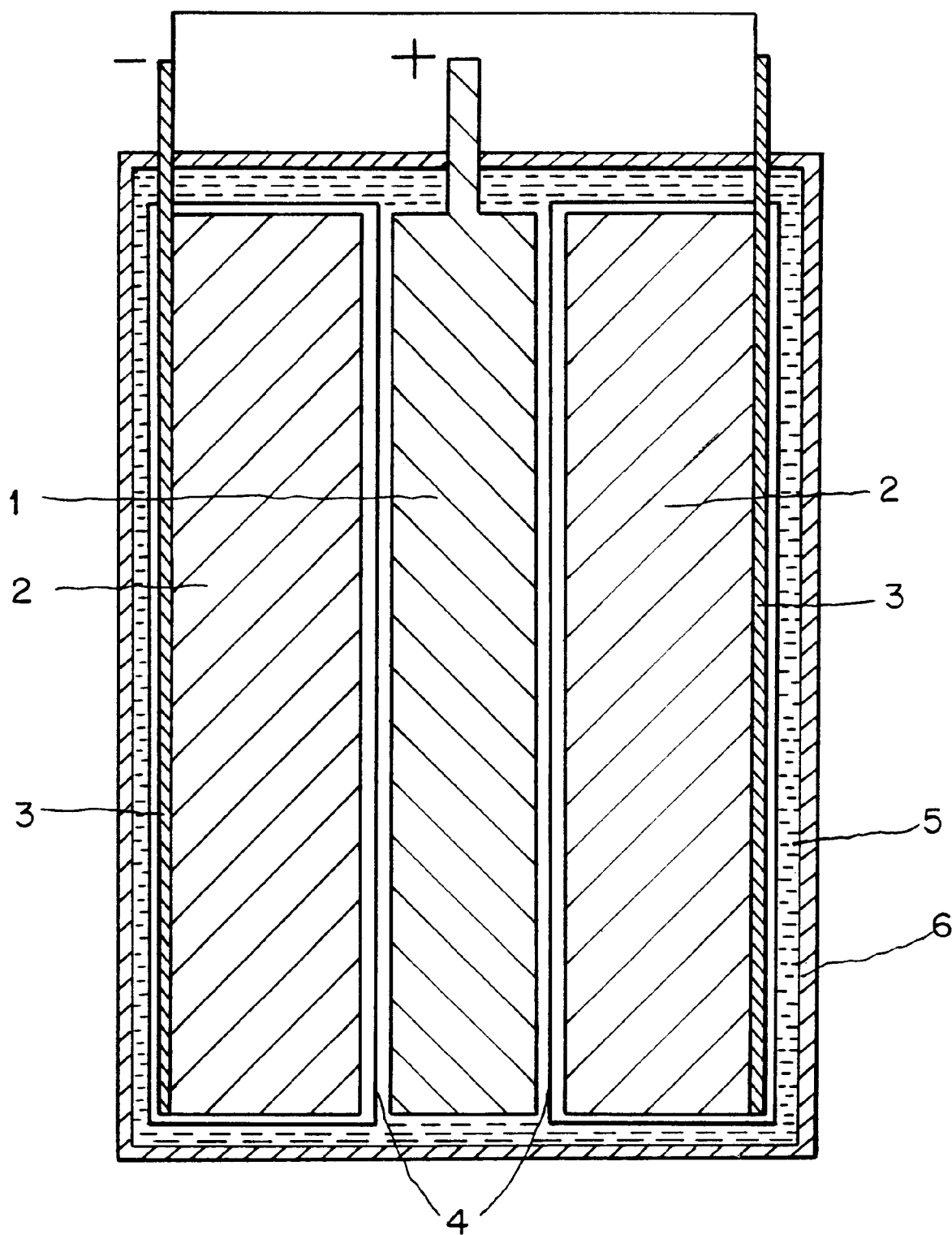

CAPACITOR WITH DUAL ELECTRIC LAYER

TECHNICAL FIELD

The invention relates to electrical engineering and can find application in producing dual electric layer (DEL) capacitors having high specific power characteristics and capable of storing and putting out electric power at a high rate.

BACKGROUND ART

Known in the art presently are dual electric layer capacitors with liquid electrolyte and electrodes made of diverse materials having high specific surface area (cf., e.g., U.S. Pat. No. 4,313,084 (1982) and U.S. Pat. No. 4,713,734 (1987), and DE U.S. Pat. No. 3,210420 (1983). Best results are attained when using the various activated carbons as the electrode materials. Specific capacitance of such capacitors exceeds 2 F/cu.cm, while use of aprotic electrolytes makes it possible to increase capacitor working voltage to 2–3 V (U.S. Pat. No. 4,697,224 (1987), Nat. Tech. Report, 180, 26, # 2, pp.220–230).

Closest to the proposed invention as to the technical essence and attainable effect is a DEL capacitor comprising two electrodes and liquid electrolyte (i.e., an aqueous alkali-metal hydroxide with a concentration of 3 to 7 mole/lit having a polarizable (negative) electrode made of a carbon fibrous material and a non-polarizable electrode made of nickel oxide. Maximum voltage of said capacitor equals 1.4 V and specific capacitance and specific energy, 46 F/cu.cm and 45 J/cu.cm, respectively (WO 97/07518 dated Feb. 27, 1997).

DISCLOSURE OF THE INVENTION

Despite the presence of a number of technical solutions aimed at improving in DEL capacitors the problem how to enhance their specific characteristics still remains an urgent one. Thus, in particular, the values of specific capacitance and specific energy attainable by the heretofore-known capacitors, as well as their cost place limitation upon their use in electrically driven transport facilities.

Therefore the invention has for its primary and essential object to attain higher energy density and lower cost of DEL capacitors.

The foregoing object is accomplished due to the herein-disclosed invention whose essence resides in that the polarizable capacitor electrode is made of a carbon material and the non-polarizable electrode is made of a material incorporating lead dioxide as the active component.

Though a capacitor having such a combination of electrodes can make use of a variety of electrolytes, it is preferable to use aqueous solutions of inorganic acids and mixtures thereof.

It is due to the solution disclosed before that the specific energy of DEL capacitors is managed to be increased and their cost to be reduced. Increased specific energy is attained due to an increase in the capacitor operating voltage to 2.2–2.6 V, as well as by virtue of a 1.2–1.4 times increase in the electric capacitance of the carbon material attainable in an acid solution compared with an alkali solution.

And the cost of a DEL capacitor made according to the present invention is reduced due to the use of a lead-dioxide electrode which is cheaper than a nickel-oxide one.

BRIEF DESCRIPTION OF THE DRAWINGS

The accompanying Drawing illustrates the construction arrangement of the DEL capacitor, according to the invention.

The capacitor has a positive electrode 1, a negative electrode 2, current leads 3, a separator 4, and a jar 6 filled with an electrolyte 5.

DETAILED DESCRIPTION OF THE PREFERRED EMBODIMENTS

The essence of the invention is illustrated by the Example that follows.

Used as a positive (non-polarizable) electrode in the capacitor is the one made of a material containing lead dioxide ($PbO_2$) and having geometrical dimensions of 125×70×0.8 mm, and used as a negative (polarizable) electrode is a fabric from activated carbon fibers having geometrical dimensions of 125×70×1.21 mm. The negative electrode has a specific capacitance of 512.3 F/g. The negative electrode 2 provided with the lead current leads 3 and having a total weight of 12.8 g and geometrical dimensions of 125×70×0.2 mm is composed of two electrically interconnected pieces and is placed in a bag of the polypropylene separator 4 0.1 mm thick. Two pieces of the negative electrode are forced against the surface of the positive electrode 1 on both sides thereof. Used as electrolyte is an aqueous sulfuric acid having a density of 1.25 g/cu.cm.

The capacitor is discharged with 2.5 A direct current. The discharge voltage drops down from 2.2 to 0.8 V.

Under the aforementioned discharge conditions specific energy of the capacitor is 56.2 J/g (270 J/cu.cm). An internal resistance of the capacitor equals $10.1 \cdot 10^{-3}$ Ohm. The potential across the non-polarizable lead-dioxide electrode drops down from 1.71 to 1.625 V throughout the discharge procedure, that is, remains virtually invariable.

The herein-proposed capacitor makes possible practising series- and parallel connections of a plurality of capacitors and preparing on its base a variety of capacitor banks.

With the discharge voltage range extended the specific energy of a capacitor increases.

The Example described before is an illustrative but by no means restrictive one. Those skilled in the art may therefore introduce a variety of obvious alterations and modifications therein. Thus, an embodiment of the herein-proposed capacitor is practicable, wherein electrolyte is confined between the electrodes by virtue of surface tension forces so that no special jar or shell is required for electrolyte to fill in.

Though an embodiment has been adduced wherein used as electrolyte is an aqueous inorganic acid, some other electrolytes can be made use of, such as aqueous inorganic salts, thixotropic mixtures of acids and salts, and proton-conducting solid electrolytes (membranes).

All these modifications and alterations are considered to remain within the limits of the spirit and scope of the invention as characterized in the set of claims that follows.

What is claimed is:

1. A dual electric layer capacitor, CHARACTERIZED in that it comprises:

a polarizable electrode which is made substantially from a carbon material;

a non-polarizable electrode which is made substantially from a material containing lead dioxide; and an electrolyte.

2. A capacitor according to claim 1 CHARACTERIZED in that said capacitor comprises a separator, which separates the electrodes.

3. A capacitor according to claim 1 CHARACTERIZED in that the electrolyte is essentially aqueous solutions of inorganic acids and mixtures thereof.

4. A dual electric layer capacitor, CHARACTERIZED in that it comprises:
- a polarizable electrode which is made substantially from a carbon material;
- a non-polarizable electrode which is made substantially from a material containing lead dioxide;
- an electrolyte; and
- a jar wherein said electrodes and said electrolyte are accommodated.

\* \* \* \* \*

UNITED STATES PATENT AND TRADEMARK OFFICE
CERTIFICATE OF CORRECTION

PATENT NO. : 6,195,252 B1
DATED : February 27, 2001
INVENTOR(S) : Belyakov et al.

It is certified that error appears in the above-identified patent and that said Letters Patent is hereby corrected as shown below:

<u>Title page,</u>
Item [73], change the spelling of the first assignee to read:

-- Nauchno-Proizvodstvennoe Predpriyatie Eksin --.

Signed and Sealed this

Seventh Day of January, 2003

JAMES E. ROGAN
*Director of the United States Patent and Trademark Office*